US008012427B2

(12) United States Patent
Bommarito et al.

(10) Patent No.: US 8,012,427 B2
(45) Date of Patent: Sep. 6, 2011

(54) APPARATUS AND METHOD FOR DETECTING AN ANALYTE

(75) Inventors: G. Marco Bommarito, Stillwater, MN (US); Larry H. Dodge, Hernando, FL (US); Brinda B. Lakshmi, Woodbury, MN (US); Triet M. Lu, Woodbury, MN (US); Jeffrey D. Smith, Marine on St. Croix, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 527 days.

(21) Appl. No.: 11/997,582

(22) PCT Filed: Aug. 2, 2006

(86) PCT No.: PCT/US2006/030339
§ 371 (c)(1), (2), (4) Date: Jul. 31, 2008

(87) PCT Pub. No.: WO2007/016692
PCT Pub. Date: Feb. 8, 2007

(65) Prior Publication Data

US 2008/0302193 A1 Dec. 11, 2008

Related U.S. Application Data

(60) Provisional application No. 60/705,088, filed on Aug. 2, 2005.

(51) Int. Cl.
*G01N 21/75* (2006.01)

(52) U.S. Cl. ........................................................ 422/400

(58) Field of Classification Search .................... 422/58, 422/400
See application file for complete search history.

(56) References Cited

U.S. PATENT DOCUMENTS

| | | | | |
|---|---|---|---|---|
| 2,490,168 | A | 12/1949 | Strauss | 128/269 |
| 3,214,782 | A | 11/1965 | Masters et al. | 15/521 |
| 3,938,898 | A | 2/1976 | Reitknecht | 401/183 |
| 3,958,571 | A | 5/1976 | Bennington | 128/269 |
| 4,197,287 | A | 4/1980 | Piasio et al. | 424/1 |
| 4,329,990 | A | 5/1982 | Sneider | 128/239 |
| 4,657,869 | A | 4/1987 | Richards et al. | 435/287 |
| 4,707,450 | A | 11/1987 | Nason | 435/295 |
| 4,747,719 | A | 5/1988 | Parkin | 401/132 |
| 4,747,720 | A | 5/1988 | Bellehumeur et al. | |
| 4,770,853 | A | 9/1988 | Bernstein | 422/58 |
| 5,226,744 | A | 7/1993 | Kemmerer | 401/4 |

(Continued)

FOREIGN PATENT DOCUMENTS

CA 2 237 209 11/1999

(Continued)

OTHER PUBLICATIONS

Cho, H.N.; Hong, J.M.; Moon, D.K.; Kim, C.Y. "Synthesis and luminescent characteristics of fluorene-based polymers containing diacetylene unit." Synthetic Metals, 2000, 111-112, pp. 429-431.*

(Continued)

*Primary Examiner* — Bobby Ramdhanie
(74) *Attorney, Agent, or Firm* — Michael G. Williams

(57) ABSTRACT

An apparatus assembly for detecting an analyte in a sample of material includes a valve, a frame, and a plurality of housing segments. The valve may be actuated to adjust a flow path and flow rate through the housing segments.

22 Claims, 6 Drawing Sheets

U.S. PATENT DOCUMENTS

| | | | | |
|---|---|---|---|---|
| 5,238,649 | A | 8/1993 | Nason | 422/58 |
| 5,266,266 | A | 11/1993 | Nason | 422/58 |
| 5,422,273 | A | 6/1995 | Garrison et al. | 435/296 |
| 5,607,863 | A | 3/1997 | Chandler | 436/518 |
| 5,658,531 | A | 8/1997 | Cope et al. | 422/58 |
| 5,711,446 | A | 1/1998 | Jeffs et al. | 220/23.83 |
| 5,853,600 | A | 12/1998 | McNeal et al. | 210/789 |
| 5,879,635 | A | 3/1999 | Nason | 422/102 |
| 6,171,259 | B1 | 1/2001 | Fisher | 600/549 |
| 6,248,294 | B1 | 6/2001 | Nason | 422/58 |
| 6,291,234 | B1 | 9/2001 | Raz et al. | 435/309 |
| 6,346,087 | B1 | 2/2002 | Peltier | 600/569 |
| 6,386,865 | B1 | 5/2002 | Suh et al. | 433/27 |
| 6,394,966 | B1 | 5/2002 | Gill et al. | 600/569 |
| 6,524,530 | B1 | 2/2003 | Igarashi et al. | 422/58 |
| 6,806,094 | B2 | 10/2004 | Anderson et al. | 436/180 |
| 6,889,468 | B2 | 5/2005 | Bedingham et al. | 43/45 |
| 6,979,576 | B1 | 12/2005 | Cheng et al. | 436/807 |
| 7,041,469 | B2 | 5/2006 | Lawrence et al. | 435/23 |
| 7,056,473 | B2 | 6/2006 | Harris et al. | 422/63 |
| 2001/0012612 | A1 * | 8/2001 | Petersen et al. | 435/5 |
| 2002/0042125 | A1 | 4/2002 | Petersen et al. | 435/287 |
| 2003/0109804 | A1 | 6/2003 | Auerbach et al. | 600/569 |
| 2003/0129767 | A1 | 7/2003 | Bautista et al. | 436/178 |
| 2003/0214997 | A1 | 11/2003 | Diekmann et al. | 374/102 |
| 2004/0119070 | A1 | 6/2004 | Roach et al. | 257/48 |
| 2004/0132217 | A1 | 7/2004 | Prince et al. | 436/518 |
| 2004/0137634 | A1 | 7/2004 | Robole et al. | 436/45 |
| 2004/0170536 | A1 | 9/2004 | Daykin | 422/102 |
| 2005/0153370 | A1 | 7/2005 | Lakshmi et al. | 435/7 |
| 2005/0161669 | A1 | 7/2005 | Jovanovich et al. | 257/48 |
| 2006/0046310 | A1 | 3/2006 | Xia et al. | 436/514 |
| 2006/0078923 | A1 | 4/2006 | McKernan et al. | 435/6 |
| 2006/0134796 | A1 | 6/2006 | Bommarito et al. | 436/166 |

FOREIGN PATENT DOCUMENTS

| | | | |
|---|---|---|---|
| EP | 0 286 371 | A2 | 10/1988 |
| EP | 0 439 917 | A1 | 8/1991 |
| EP | 0 482 721 | A2 | 4/1992 |
| EP | 0 594 260 | A1 | 4/1994 |
| EP | 1 024 354 | A1 | 8/2000 |
| FR | 2 598 299 | | 11/1987 |
| GB | 1 409 854 | | 10/1975 |
| GB | 2 416 173 | A | 1/2006 |
| GB | 2 432 420 | A | 5/2007 |
| JP | 2001-000170 | | 1/2001 |
| WO | WO 93/12421 | | 6/1993 |
| WO | WO 94/26414 | | 11/1994 |
| WO | WO 96/14570 | | 5/1996 |
| WO | WO 98/39657 | | 9/1998 |
| WO | WO 00/72012 | A2 | 11/2000 |
| WO | WO 02/070644 | | 9/2002 |
| WO | WO 03/057369 | A1 | 7/2003 |
| WO | WO 03/084450 | A2 | 10/2003 |
| WO | WO 2004/057331 | A1 | 7/2004 |
| WO | WO 2004/065010 | A2 | 8/2004 |
| WO | WO 2005/032377 | | 4/2005 |
| WO | WO 2005/068969 | A1 | 7/2005 |
| WO | WO 2007/016692 | A1 | 2/2007 |
| WO | WO 2007/035750 | A1 | 3/2007 |
| WO | WO 2007/093009 | | 8/2007 |

OTHER PUBLICATIONS

Cope, G. et al.; "A simple near-patient test for nicotine and its metabolites in urine to assess smoking habit"; Clinica Chimica Acta 25 (1996) 135-149.

Bowen, W.H.; "Biochemical and Micro-Analytical Methods"; Adv. Dent Res. 1(1); Oct. 1987; pp. 88-91.

Becton Dickinson and Company brochure entitled "BD Directigen™ EZ Family of Products" (3 pgs.); www.bd.com/ds/productcenter/256017.asp.

Sharp, B. "Vulvo-Vaginitis"; British Journal of Venereal Diseases; 6; 1930; pp. 301-317.

Mascall, N. "Some Reflections on the *Trichomonas Vaginalis*"; British Journal of Venereal Diseases; 30(3); Sep. 1954; pp. 156-162.

Glick, S. "Double-Contrast Barium Enema for Colorectal Cancer Screening: A Review of the Issues and a Comparison with Other Screening Alternatives"; American Journal of Roentgenology; 174; Jun. 2000; pp. 1529-1537.

Bronowicki, J. et al. "Patient-to-Patient Transmission of Hepatitis C Virus During Colonoscopy"; The New England Journal of Medicine; vol. 337; No. 4; Jul. 24, 1997; pp. 237-240.

* cited by examiner

APPARATUS AND METHOD FOR DETECTING AN ANALYTE

CROSS REFERENCE TO RELATED APPLICATIONS

This application is a national stage filing under 35 U.S.C. 371 of PCT/US2006/030339, filed Aug. 2, 2006, which claims priority to U.S. Provisional Application No. 60/705,088, filed Aug. 2, 2005, the disclosure of which is incorporated by reference in its/their entirety herein.

BACKGROUND

Many industries, such as the medical and food service industries, often require the testing of a sample of material in order to determine whether a certain biological bacterium or other organism is present. The presence of such an organism may be indicative of a problem. For example, the presence of the organism may indicate the presence of infection in a person or the presence of a contaminant in food or on a food preparation surface.

In existing methods of testing the sample of material, a sample collection device, such as a swab, which includes a porous medium on the end of a shaft, may be used to gather the sample of material. Specifically, the porous medium of the swab may be placed in contact with a sample source, such as a nose, ear, or throat of a person, or a food preparation surface, and a sample may then adhere to the porous medium. Thereafter, the sample collection device may be transferred to a different location, such as a laboratory, where the collected sample is transferred from the sample collection device to a slide or other external laboratory apparatus in order to run an assay to analyze whether the particular organism of interest is present. The particular organism of interest may be referred to as an "analyte".

In addition to a delay in time, the transfer of the sample collection device from the sample source to the off-site location may cause the collected sample to become contaminated or dry out, which may decrease the reliability of the analyte detection. The present invention addresses these and/or other problems and provides advantages not previously recognized.

BRIEF SUMMARY

The application discloses, in one aspect, an apparatus to process a sample of biological material. The apparatus comprises a central housing segment comprising a capture medium adapted to isolate an analyte from the sample of biological material, a first housing segment configured to receive a sample collection assembly having a first fluid reservoir and the apparatus including a flow path from the first housing segment to the central housing segment, and a second housing segment comprising a testing device and the apparatus including a flow path between the central housing segment and the second housing segment. The apparatus further comprises a third housing segment configured to retain at least a portion of the first fluid after it is released from the first fluid reservoir and the apparatus including a flow path between the central housing segment and the third housing segment, a fourth housing segment comprising a second fluid reservoir and the apparatus including a flow path between the fourth housing segment and the central housing segment, and a valve assembly configured to regulate flow in at least one of the flow paths between the first, second, third and fourth housing segments and the central housing segment.

In another aspect, a method is disclosed of processing a sample of biological material. The method comprises eluting a sample of biological material from a sample collection device into a first housing segment using a first fluid, directing the first fluid along a first flow path from the first housing segment to a central housing segment to capture an analyte in a central cavity, collecting the first fluid from the central cavity in a third housing segment, actuating a valve to close a flow path from the central housing segment to the third housing segment and open a flow path from the central cavity to a second housing segment, and introducing a second fluid from a fourth housing segment into the central housing segment to release the analyte from a capture medium, and provide fluid flow from the central housing segment into the second housing segment for testing.

The above summary is not intended to describe each disclosed embodiment or every implementation of the present invention. The figures and the detailed description which follow more particularly exemplify illustrative embodiments.

BRIEF DESCRIPTION OF THE DRAWINGS

The present invention will be further explained with reference to the drawing figures listed below, where like structure is referenced by like numerals throughout the several views.

FIG. 6A is a top view, with interior portions of the valve and frame thereunder shown in phantom.

FIG. 6B is a bottom end view (from the bottom of FIG. 6A).

FIG. 6C is a side view (from the right side of FIG. 6A).

Figure 1:
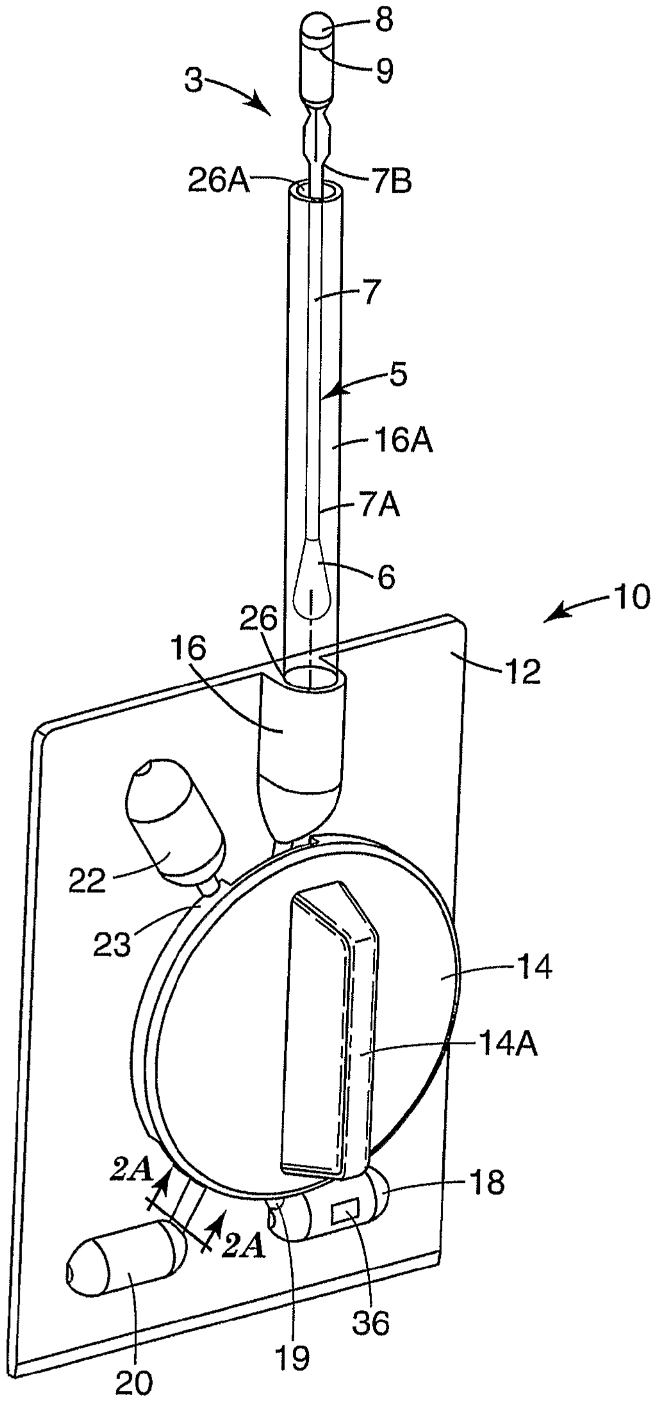
FIG. 1 is a perspective view of an exemplary embodiment of an apparatus of the present invention, which includes a frame, a valve, and a plurality of housing segments disposed about the valve.

While the above-identified figures set forth an exemplary embodiment of the present invention, other embodiments are also within the invention. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION

The present invention is a substantially self-contained apparatus for running an assay to detect an analyte, such as *staphylococcus aureus*, in a sample of material. An embodiment of the apparatus includes a plurality of housing segments. Disposed within the housing segments are the necessary buffer solutions, a testing device, and other components that are necessary for running the assay. This will be described in further detail below. The apparatus also includes a valve, which may be actuated to adjust a flow path of fluid through the apparatus. The valve may be used to both open up selective flow paths (or "pathways") as well as control the flow rate through the flow path by opening up the flow path partially or fully. In the exemplary embodiment, four housing segments are disposed about the central housing segment. By actuating a valve, a flow path through the central housing is modified, and as a result, different housing segments are fluidically connected with one another. In this way, each housing segment is in selective fluidic communication with at least one another housing segment.

The apparatus is substantially self-contained because generally all the chemistry for detecting the analyte is contained in the housing. This decreases the chance that an apparatus operator will be exposed to the analyte and/or fluids that are used in the testing process, such as by an accidental spill or otherwise. The inventive apparatus assembly is a relatively simple device that allows a sample of material to be tested for an analyte at or near the sample source. Rather than transferring the sample of material to an off-site laboratory, the present invention allows an operator to obtain a sample of material from a sample source and then test the sample for the presence of an analyte at or near the sample source. This helps to decrease the waiting time for a test result. Furthermore, the apparatus assembly may be disposable, which helps to provide a clean, if not sterile, apparatus assembly for each use.

Of course, the inventive apparatus may also be used in a laboratory or other off-site setting. Rather than an operator manually actuating the apparatus valve in order to adjust the flow path through the central housing segment, the valve may be coupled with an automated machine, whereby the automated machine actuates the valve after a preset amount of time. The automated machine may be as simple as an egg timer or a similar spring-loaded device. The option of using an automated valve actuator allows multiple assays to be run at once.

The present invention is described in reference to an exemplary embodiment, which uses an indirect assay to detect an analyte in a sample of material. A general understanding of the assay process that is used with the exemplary embodiment will help aid in the description of the inventive apparatus. However, the following description of the assay process is not intended to limit the present invention in any way. Rather, the inventive apparatus and method of detecting an analyte in a sample of material may be applied to many different types of assays, direct or indirect.

In accordance with the exemplary embodiment, a sample of material is obtained with a device. Prior to running the assay, the sample of material is prepared. In the sample preparation stage, the sample of material is eluted (or "released") from the sample collection device with a first buffer solution, rendering an eluted sample. At least some of the analyte is then isolated from the eluted sample. This is done with a capture medium. The sample of material is typically a heterogeneous mixture of material. It may be necessary to isolate and, in some sense, concentrate the analyte because some analytes are only detected in large quantities. The isolation/concentration may increase the chance of an accurate detection.

Therefore, in order to help increase the possibility that the organism will be detected by a testing device, the organism (i.e., the analyte) is isolated from the remaining debris in the sample of material. The testing device may be any suitable device, such as a calorimetric sensor.

An exemplary analyte of interest to detect is *Staphylococcus aureus* ("*S. aureus*"). This is a pathogen causing a wide spectrum of infections including: superficial lesions such as small skin abscesses and wound infections; systemic and life threatening conditions such as endocarditis, pneumonia and septicemia; as well as toxinoses such as food poisoning and toxic shock syndrome. Some strains (e.g., Methicillin-Resistant *S. aureus* or MRSA) are resistant to all but a few select antibiotics.

At least some of the analyte captured by the capture medium is then released (or lysed) therefrom with a second buffer solution. The second buffer solution may contain a lysing agent, such as those described in U.S. Patent Application Publication No. 2005/0153370 A1, entitled "Method of Enhancing Signal Detection of Cell-Wall Components of Cells."

The released analyte and second buffer solution is then put in contact with a reagent that is adapted to react with the released analyte. If a direct assay is used, a reagent may not be necessary. After the analyte and reagent react, and after a sufficient "reaction time", the analyte and reagent, along with the second buffer solution, contact the testing device. In an indirect assay, a testing device detects the presence of a reagent adapted to react with the analyte rather than the analyte itself. Specifically, the reagent and analyte react, and then any remaining reagent (i.e., the reagent that has not reacted with the analyte to form a separate product) reacts with the testing device. Thereafter, the testing device provides a visual indicium of the presence and/or quantity of reagent. It is preferred that the analyte and reagent are given sufficient time to react prior to contacting the testing device.

In one embodiment, the reagent reacts with a surface of the testing device (e.g., a red color), and the testing device changes color as the reagent reacts with the testing device. If a large quantity of reagent reacts with the testing device, the testing device may change color, for example, from red to blue. If a small quantity of reagent reacts with the testing device, the testing device may not change color and remain red. The testing device may also be configured to provide an indicium of the quantity of reagent present (which typically represents the quantity of analyte present in the sample of material). For example, the testing device may change color, where the intensity or hue of the color changes depending upon the amount of reagent present. In alternate embodiments, the testing device measures the amount of reagent in another suitable way.

The quantity of reagent present indicates the quantity of analyte present because typically, a large quantity of reagent present after the reaction with the analyte indicates that there was not a large quantity of analyte present in the sample of material. Similarly, a small quantity of reagent present after the reaction with the analyte indicates that there was a large quantity of analyte present in the sample of material.

In the exemplary embodiment of the present invention, first, second, third, and fourth housing segments are disposed about a central housing segment. For clarity of description, the four housing segments are numbered in a clockwise direction. The exemplary apparatus is shown in FIG. 1. A valve is positioned to open or close off different flow paths through the central housing segment. The valve includes two positions: 1) a sample preparation position (e.g., valve 14 shown in FIG. 4A), where the valve is positioned to fluidically connect a first housing segment including a sample of material with a third housing segment, which retains "waste", and 2) a testing position (e.g., valve 14 shown in FIG. 4B), where the valve is positioned to fluidically connect a fourth housing segment that includes a buffer solution with a second housing segment, which includes a testing device adapted to detect the analyte and provide a visual indicium of the presence or absence of the analyte.

Any suitable number of housing segments may be used in alternate embodiments. The number of housing segments may depend on, for example, the type of assay chemistry used. Those skilled in the art may modify the exemplary invention in order to adapt the present invention to a different type of assay.

FIG. 1 is a perspective view of an exemplary embodiment of apparatus 10 of the present invention, which includes frame 12, rotary valve 14 (with handle 14A), central housing segment 15 (shown in FIG. 3), first housing segment 16 (with extension tube 16A), second housing segment 18, third housing segment 20, and fourth housing segment 22. Frame 12 is a rigid material, such as cardboard, plastic, metal foil, or a combination of the same. In some embodiments, frame 12 may include a protective coating in order to help frame 12 resist fluids and to help protect frame 12 from damage due to exposure to fluids (e.g., water damage). Valve 14 is a rotary valve that includes a seal selector to selectively seal off pathways 17, 19, 21, and 23 (shown in FIG. 3) between central housing segment 15 and each of the housing segments 16, 18, 20, and 22, respectively. However, any suitable valve may be substituted for valve 14 in alternate embodiments.

First, second, third, and fourth housing segments 16, 18, 20, and 22, respectively, are disposed about central housing segment 15 and are in selective fluidic communication therewith. Specifically, valve 14 may be actuated in order to selectively fluidically connect two or more housing segments 15, 16, 18, 20, and 22. The capability of valve 14 to adjust flow paths through central housing segment 15 enables an operator to control when different fluids (e.g., buffers) contained within one or more housing segments 15, 16, and/or 22 are released, which may allow the operator to control when the assay is run and to control reaction times. This will be described in greater detail below.

In the exemplary embodiment, housing segments 15, 16, 18, 20, and 22, are formed of a single piece of a flexible film, such as a plastic film, that is attached to one side of frame 12 using any suitable method, such as a pressure sensitive adhesive. As a result of this construction, apparatus 10 has a relatively low profile (e.g., less than 2.5 centimeters thick). Preferably, the film and frame 12 are attached so as to form a leak proof assembly. Housing segments 15, 16, 18, 20, and 22 may be formed by any suitable method, including vacuum forming a sheet of flexible film to form a plurality of blister-like housing segments and by attaching the flexible film to frame 12.

A general description of each housing segment will be followed by a detailed description of each housing segment and the operation of apparatus 10. Central housing segment 15 includes capture medium 24 (shown in phantom in FIG. 3), which is adapted to capture analyte from a sample of material. First housing segment 16 is configured to receive sample acquisition assembly 3, which preferably includes sample acquisition device 5 including porous medium 6, hollow shaft 7 (with first end 7A and second end 7B), and first fluid reservoir 8 in selective fluidic communication with hollow shaft 7. First fluid reservoir 8 retains first fluid 9. Second housing segment 18 includes a testing device adapted to detect presence of the analyte. Third housing segment 20 is configured to retain at least a substantial amount of a first fluid that after it is released from the first fluid reservoir. Fourth housing segment 22 includes a second fluid reservoir, which includes second fluid 25.

Valve 14 may be actuated between a sample preparation position and a testing position. For example, an operator may grasp handle 14A (with a tool, manually, or otherwise) to rotate valve 14. As FIG. 3 will show, without valve 14, each housing segment 15, 16, 18, 20, and 22 is fluidically connected to each other. Valve 14 is configured to selectively close off specific housing segments 16, 18, 20, and 22. Otherwise stated, depending on its rotation position relative to frame 12, valve 14 is configured to selectively close off specific pathways 17, 19, 21, and 23 between each housing segment 16, 18, 20, and 22, respectively, and central housing segment 15.

Figure 2A:
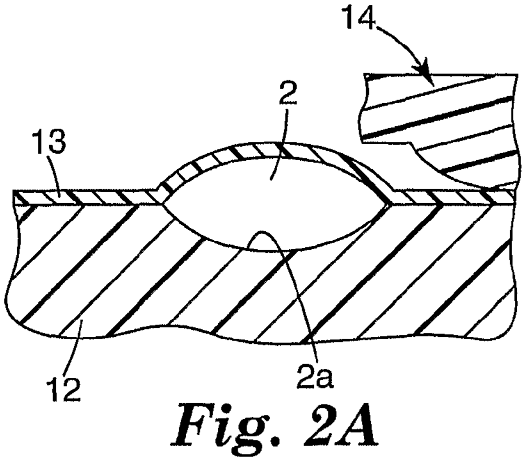
FIG. 2A illustrates an example of an open flow path (or pathway) between a central housing segment (shown in FIG. 3) and another housing segment.
Figure 2B:
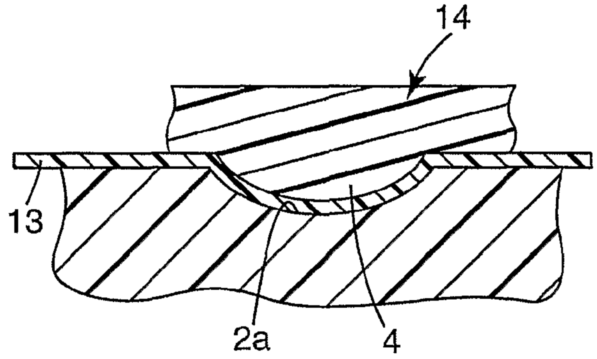
FIG. 2B illustrates the flow path of FIG. 2A, which has now been closed off with a rib of a valve.
Figure 2C:
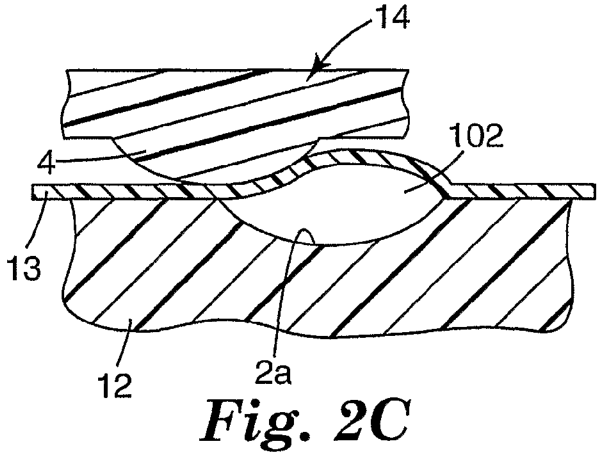
FIG. 2C illustrates the flow path of FIG. 2A, which is now partially closed with a rib of the valve.

FIGS. 2A-2C illustrate an exemplary embodiment of valve 14 and how the seal selector feature of valve 14 opens and closes different pathways. FIG. 2A is a cross-section of an exemplary open pathway 2, which is representative of pathway 17, 19, 21, or 23. Pathway 2 is formed between frame 12 and flexible material 13, which forms each housing segment 15, 16, 18, 20, and 22. The cross-section shown in FIG. 2A is representative of a cross-section taken along line A-A in FIG. 1.

Figure 3:
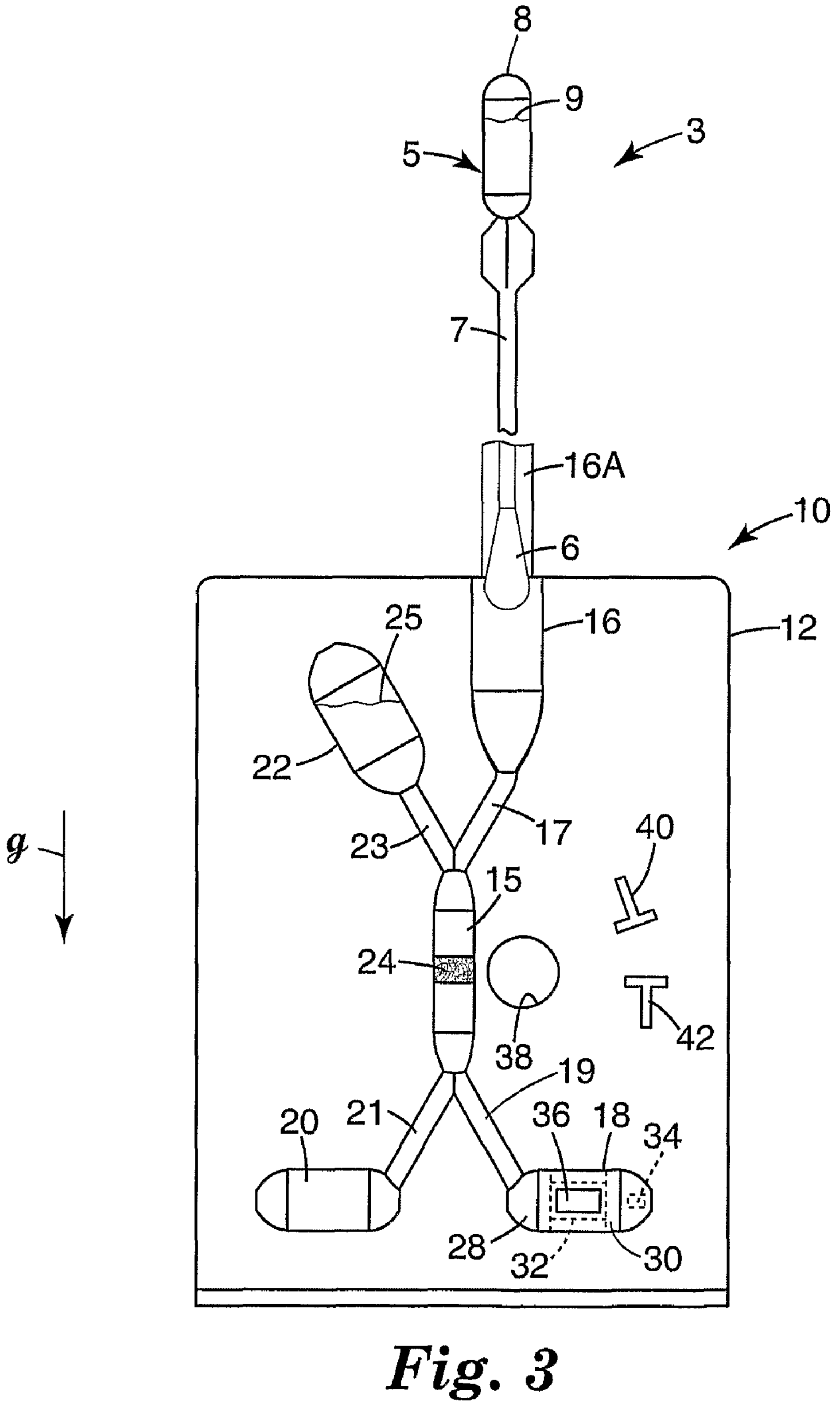
FIG. 3 is a side view of the apparatus of FIG. 1, where the valve has been removed to show a central housing segment and the pathways connecting the central housing segment to each housing segment shown in FIG. 1.

FIGS. 2B illustrates how rib 4 of valve 14 may be used to close pathway 2. Valve 14 may include a plurality of ribs, where each rib corresponds to a pathway 17, 19, 21, and 23. Valve 14 may be actuated to rotate rib 4 in and out of position (where in the "in position", rib 4 is positioned within a notch 2*a* formed by pathway 2 in frame 12) in order to close and open pathway 2. Valve 14 is biased toward frame 12 by suitable bias means, such as a spring. Rib 4 is configured to fit within notch formed by pathway 2 as valve 14 is actuated and rib 4 passes over pathway 2. In this way, rib 4 acts as a detent for valve 14. As rib 4 fits within notch 2*a*, tactile and/or audible feedback is supplied to an operator that valve 14 is in a correct position. The detent also helps prevent accidental movement of valve 14, such as during shipping, storage, or during operation of apparatus 10. As seen in FIG. 3, flexible material 13 folds back on itself when rib 4 is positioned over pathway 2. It is preferred that flexible material 13 that forms each housing segment and pathway of apparatus 10 does not pinch or wrinkle as rib 4 slides into notch 2*a*.

FIG. 2C illustrates how valve 14 may be used to control a flow rate through pathway 2 by actuating rib 4 only partially over pathway 2 (shown in FIG. 2A) to form partially open pathway 102. Pathway 102 is smaller in cross-section than pathway 2, and so a smaller amount of fluid may pass through pathway 102, and this may increase the pressure of fluid that is moving through pathway 102.

Figure 4A:
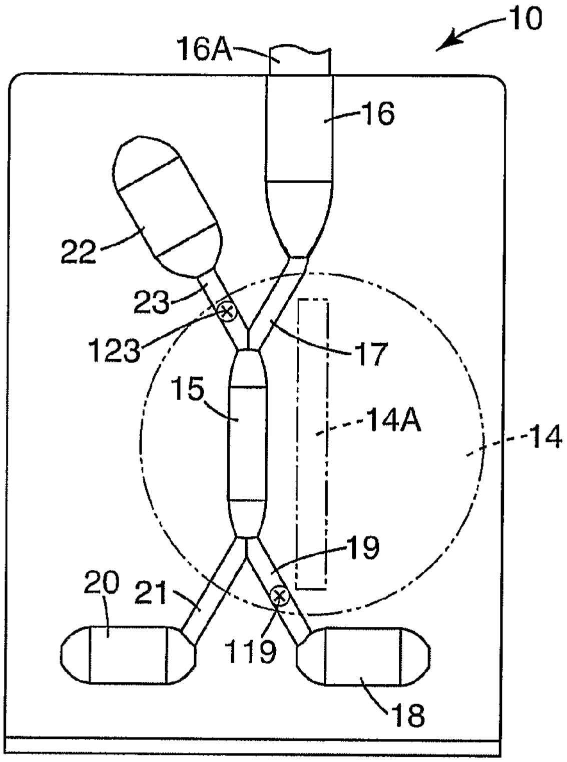
FIG. 4A is a schematic view of the apparatus of FIG. 1, where the valve is in a sample preparation orientation.

FIG. 4A is a schematic view of apparatus 10, where valve 14 (shown in phantom along with handle 14A) is in its sample preparation orientation. When valve 14 is in its sample preparation position, valve 14 closes off fluid flow pathways 19 and 23 between central housing segment 15 and second and fourth housing segments 18 and 22, respectively, as at flow restrictor locations 119 and 123. This forms a first flow path through central housing segment 15. Specifically, the first flow path is formed from first housing segment 16 through central housing segment 15 and to third housing segment 20. Therefore, first housing segment 16, central housing segment 15, and third housing segment 20 are in fluidic communication with one another when valve 14 is in its sample preparation position. In an alternate embodiment, the sample preparation position is comprised of two or more separate valve 14 positions. This embodiment will be described below. In the exemplary embodiment, pathways 19 and 23 are closed off using a rib/notch system described in FIGS. 2A-2C. In alternate embodiments, other suitable means of restricting flow in pathways 19 and 23 are used.

Figure 4B:
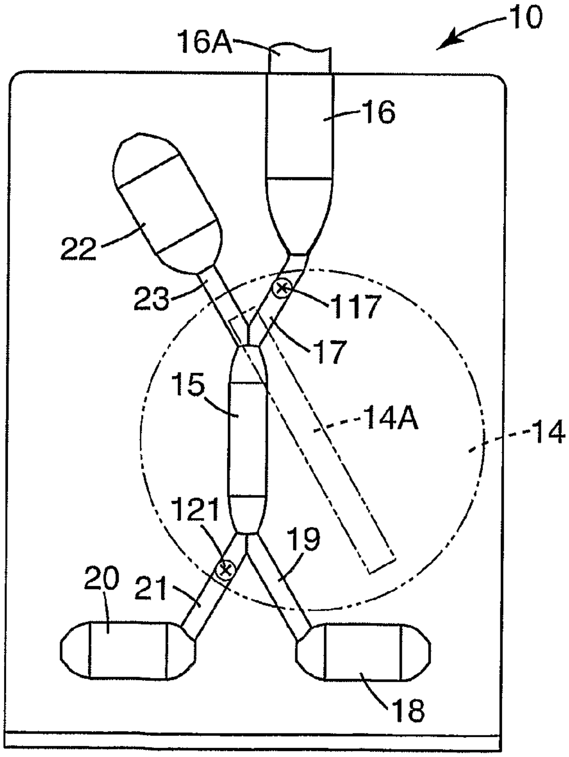
FIG. 4B is a schematic view of the apparatus of FIG. 1, where the valve is in a testing orientation.
Figure 5:
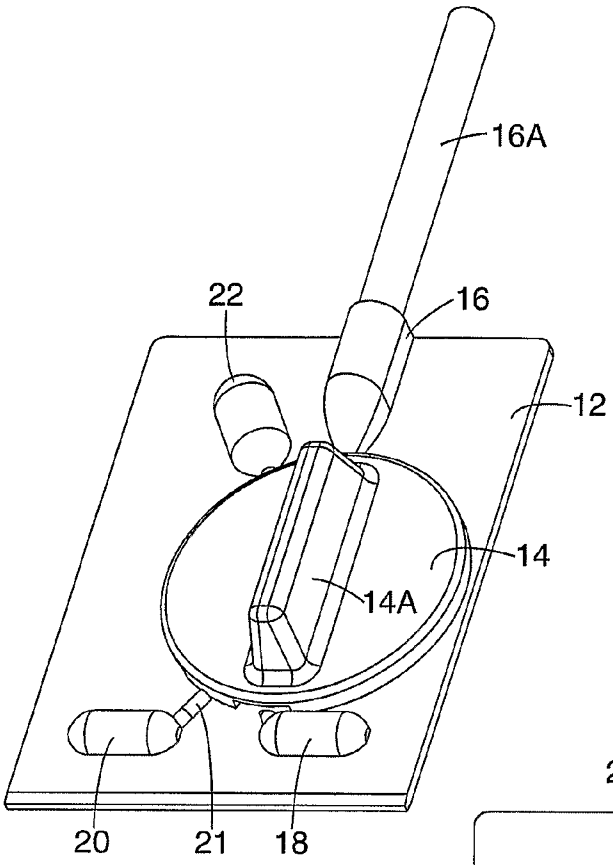
FIG. 5 is a perspective view of the inventive apparatus, where the valve is in the sample preparation orientation.

FIG. 4B is a schematic view of apparatus 10, where valve 14 (shown in phantom along with handle 14A) is in its testing orientation. As shown, valve 14 has been rotated in a counterclockwise direction to move from the sample preparation orientation (FIG. 4A) to the testing orientation (FIG. 4B). In the testing orientation, valve 14 closes off fluid pathways 17 and 21 between central housing segment 15 and first and third housing segments 16 and 20, respectively, as at flow restrictor locations 117 and 121, while at the same time opening up pathways 19 and 23 between central housing segment 15 and second and fourth housing segments 18 and 22, respectively. This forms a second flow path through central housing segment 15. Specifically, the second flow path is formed from third housing segment 20 through central housing segment 15 and to second housing segment 18. Those skilled in the art will recognize that the inventive apparatus utilizing a valve may have any suitable number of flow paths. Furthermore, any suitable mechanism for forming a plurality of flow paths through apparatus 10 may be substituted for valve 14 in alternate embodiments. In an alternate embodiment, the testing position is comprised of two or more separate valve 14 positions. This embodiment will be described below.

In the exemplary embodiment, pathways 17 and 21 are closed off using a rib/notch system described in FIGS. 2A-2C. In alternate embodiments, other suitable means of restricting flow in pathways 17 and 21 are used. Furthermore, in alternate embodiments, valve 14 does not necessarily need to close pathway 17 because if apparatus 10 is positioned so that gravity flows in direction g, fluid will not likely flow up pathway 17.

Extension tube 16A may be a separate tube which is sealably coupled to an opening 26 in first housing segment 16, or may be integrally formed with housing segment 16. In one embodiment, extension tube 16A is formed from a polymer (e.g., polyethylene) and is transparent.

Returning now to FIG. 1, first housing segment 16 and extension tube 1 6A are configured to receive sample acquisition assembly 3, which includes sample acquisition device 5 and first fluid reservoir 8. Specifically, sample acquisition assembly 3 is received in opening 26A of extension tube 16A and is preferably in close conforming contact with opening 26A so that opening 26A is substantially covered by sample acquisition assembly 3. Sample acquisition device 5 may be any suitable device, such as a swab. Examples of suitable sample acquisition devices are described in U.S. Pat. No. 5,266,266, entitled, "SPECIMEN TEST UNIT", and U.S. Patent Application Ser. No. 60/705,140, entitled, "APPARATUS AND METHOD FOR COLLECTING A SAMPLE OF MATERIAL," which was filed on the same date as the present application. In the exemplary embodiment, it is preferred that sample collection device 5 include hollow shaft 7, having first end 7A and second end 7B opposite first end 7A, and porous medium 6 attached to first end 7A of hollow shaft 7. Porous medium 6 of sample acquisition device 3 may be placed in contact with a sample source, such as a nose, ear, or throat of a person, or a food preparation surface, and a sample may then adhere to porous medium 6. By introducing sample acquisition device 5 into opening 26A, a sample is introduced into apparatus 10.

The exemplary first fluid reservoir 8 retains a first fluid 9, which may be a buffer solution. Examples of suitable first fluid reservoirs include, but are not limited to, a deformable squeeze bulb, a syringe, or an accordion pleat bulb. The structure of the reservoir 8 (or some other feature on the sample acquisition assembly 3) is larger than opening 26A, thus preventing overinsertion of sample acquisition assembly 3 into extension tube 16A and first housing segment 16. The length of extension tube 16A is greater than the length of the hollow shaft 7 of the sample acquisition assembly 3, thus preventing the porous medium 6 from contacting an inner end of first housing segment 16. In fact, when the sample acquisition assembly is fully inserted into extension tube 16A to contact opening 26A, the porous medium 6 is spaced from the inner end of the first housing segment 16. Extension tube 16A thus provides a larger reservoir for buffer solution after it has been released from reservoir 8 into extension tube 16A and first housing segment 16 (larger than first housing segment 16 alone), and spaces the porous medium 6 from any fluid 9 which may pool in the first housing segment 16 and extension tube 16A.

The type of buffer solution that is to be incorporated into the assay is dependent upon many factors, including the analyte that apparatus 10 is configured to detect. First fluid reservoir 8 is attached to second end 7B of the hollow shaft. First fluid reservoir 8 is positioned to be in selective fluidic communication with hollow shaft 7 of sample acquisition device 5. "Selective fluidic communication" indicates that there is a valve, plunger (such as in a syringe) or other apparatus operator-activated means of introducing first fluid 9 disposed in first fluid reservoir 8 into hollow shaft 7 of sample acquisition device 5. Releasing first fluid 9 into hollow shaft 7 of sample acquisition device 5, elutes a sample adhered to porous medium 6, rendering an eluted sample.

In accordance with the exemplary embodiment of the present invention, the sample is eluted from porous medium 6 of sample acquisition device 3 when valve 14 is in its sample preparation position. In the sample preparation position, a sample of material is prepared for detection. As previously stated, in the sample preparation stage of the exemplary assay, an analyte is isolated from the sample of material and in the exemplary embodiment, the analyte isolation is completed while valve 14 is in its sample preparation position. Specifically, capture medium 24 (shown in phantom in FIG. 3) adapted to isolate the analyte from the sample of material is disposed within central housing 15.

After sample acquisition assembly 3 is introduced into opening 26A, and first fluid 9 is introduced into hollow shaft 7 of sample acquisition device 5, the eluted sample flows along the first flow path created by valve 14 in its sample preparation orientation. The eluted sample moves from first housing segment 16 through central housing segment 15 and to third housing segment 20. As the eluted sample flows through central housing segment 15, the eluted sample moves through capture medium 24 (shown in phantom in FIG. 3), which is disposed within central housing segment 15. Preferably, capture medium 24 is positioned and retained in such a way that fluid may pass over and through capture medium 24 while at the same time allowing capture medium 24 to capture and isolate the analyte from the sample of material. Examples of suitable capture media include, but are not limited to, beads, a porous membrane, a foam, a frit, a screen, or combinations thereof. The capture media may be coated with a ligand specific to the analyte, e.g., an antibody. In other embodiments, other means for isolating the analyte may be used. After the eluted sample moves through capture medium 24, the remainder of the eluted sample (minus the captured analyte), which are no longer necessary for the assay, flows to third housing segment 20. In this way, third housing segment 20 receives "waste". In some embodiments, an absorbent material is disposed in third housing segment 20 in order to retain the waste fluid in sufficient quantity in order to decrease the possibility that the waste fluid will move back into central housing segment 15 or another housing segment 16 18, or 22 and contaminate the assay. In alternate embodiments, other means for retaining waste fluid are used.

After the analyte is isolated from the sample of material, the sample preparation stage is complete. Of course, in other embodiments, the assay may require additional sample preparation steps. After the waste fluid has flowed to third housing segment 20, sample acquisition assembly 3 may be removed and valve 14 may be actuated (e.g., rotated) from its sample preparation position to its testing position.

After valve 14 is in its testing position, second fluid 25 disposed in fourth housing segment 22 may be released and introduced into central housing segment 15. The exemplary second fluid 25 is a second buffer solution. Once again, the type of buffer solution that is to be incorporated into the assay is dependent upon many factors, including the analyte that apparatus 10 is configured to detect. In the exemplary embodiment, a frangible seal (not shown) is disposed in pathway 23 between fourth housing segment 22 and central housing segment 15. Valve 14 is configured to pressurize pathway 23 to break the frangible seal. This allows second fluid 25 to be selectively released from fourth housing segment 22. Second fluid 25 moves through capture medium 24 disposed in central housing segment 15 and releases at least some of the analyte from capture medium 24.

Prior to contacting testing device 30, any analyte that is present is placed in contact with a reagent adapted to react with the analyte in order for the indirect assay to run properly. Because the reagent is likely dehydrated in order to keep the reagent stable during storage of apparatus 10, second fluid 25 retained in third housing segment 22 may be used to hydrate the reagent, and reactivate it. In the exemplary embodiment, a dehydrated reagent is disposed within pathway 23 and is retained in a seal formed by the flexible material forming the housing segments 15, 16, 18, 20, and 22. When fourth housing segment 22 is pressurized by valve 14, the seal containing the reagent is broken, similarly to the description of how an applied pressure to a fluid reservoir ruptures an adjacent barrier described in U.S. Patent Application Publication No. 2003/0214997, published on Nov. 20, 2003.

In alternate embodiments, the dehydrated reagent may be disposed within any suitable place within apparatus. For example, the dehydrated reagent may be disposed in fourth housing segment 22, where second fluid 25 and the dehydrated reagent are capable of being separated until the operator wishes the reagent to be hydrated. Alternatively, the reagent may also be disposed in central housing 15, pathway 19 between second housing segment 18 and central housing 15, or second housing segment 18.

After second fluid 25 releases at least some of the analyte from capture medium 24, second fluid 25 and the released analyte move into second housing segment 18 along the second flow path formed by valve 14. Where the reagent and analyte react depends on where the reagent is disposed. However, it is preferred that the analyte react with a reagent at some time prior to contacting the testing device because as previously stated, in an indirect assay, it is the reagent that reacts with the testing device. In the present invention, the analyte and reagent react in central housing segment 15. Apparatus 10 may be agitated in order to help the reagent and analyte react.

Disposed within second housing segment 18 is third fluid reservoir 28 (shown in phantom in FIG. 3) configured to receive second fluid 25 and the released analyte, testing device 30, and channel 32 connecting third fluid reservoir 28 to testing device 30. In the exemplary embodiment, channel 32 includes microfluidic elements for controlling the flow of fluid from third fluid reservoir 28 to testing device 30. Testing device 30 may require fluid to flow past it at or below a certain rate in order for the analyte or reagent in the fluid to react with testing device 30. In the case of the exemplary embodiment, an indirect assay is used, and so it is the reagent in the fluid that reacts with testing device 30. A plurality of microfluidic elements may help this regulate this fluid flow past testing device 30. In order to encourage fluid flow past testing device 30, absorbent material 34 may be positioned in second housing segment 18, where testing device 30 is positioned between channel 32 and absorbent material 34. Absorbent material 34 may help the fluid flow past testing device 30 by way of a wicking action.

Testing device 30 provides a visual indicium of whether the analyte is present in the sample of material collected with sample acquisition device 5, and in some embodiments, the test result indicates the quantity of analyte. In the exemplary embodiment, testing device 30 is a calorimetric sensor, which may include, for example, a polydimethylacetylene material, as described in U.S. Patent Application Publication No. 2004/0132217 A1, and U.S. Patent Application Ser. No. 60/636,993, filed on Dec. 17, 2004, both entitled, "COLORIMETRIC SENSORS CONSTRUCTED OF DIACETYLENE MATERIALS".

In the exemplary embodiment, a color of testing device 30 corresponds to a color-coding scheme. Testing device 30 may or may not provide a color change, depending upon whether the analyte is present in the sample of material. A user may view this color change through window 36 (shown in FIG. 3). The color change may also be graded in order to indicate the quantity of analyte present. The quantity of analyte may, for example, be indicated a color gradient which corresponds to "low level", "medium level", or "high level" indications. In some embodiments, apparatus 10 includes a label that illustrates the color-coding scheme, and an operator may compare the resulting color in window 36 with the label. In other embodiments, the color change cannot be detected with a human eye, and a machine or electronic reader, such as a spectrometer, is used to detect the color change. In alternate embodiments, other testing devices may be used. For example, apparatus 10 may incorporate a testing device whose indicium of a test result is characterized by a pH change, or some other change in the characteristic of the medium being analyzed.

After second fluid 25 and the result of the reagent/analyte reaction flow into third fluid reservoir 28, second fluid 25 and the result of the reagent/analyte reaction flow into channel 32 and contact testing device 30. After sufficient time to allow any remaining reagent (i.e., the reagent that has not reacted with the analyte) to react with testing device 30, a user may read the test result in window 36. The reaction time depends upon many factors, including the type of analyte and/or reagent. In the exemplary embodiment, the colorimetric sensor (i.e., testing device 30) is viewable through window 36. An operator (or machine) may then read a test result through window 36. Alternatively, window 36 may be positioned anywhere on apparatus 10.

FIG. 3 is a side view of apparatus 10, where valve 14 has been removed. First pathway 17 is positioned between first housing segment 16 and central housing segment 15; second pathway 19 is positioned between second housing segment 18 and central housing segment 15; third pathway 21 is positioned between third housing segment 20 and central housing segment 15; and fourth pathway 23 is positioned between fourth housing segment 22 and central housing segment 15. Each pathway 17, 19, 20, and 21 fluidically connects its respective housing segment 16, 18, 20, and 22 with central housing segment 15. Valve 14 (shown in FIG. 1) may be used to selectively close off any one of pathways 17, 19, 20, and 21.

Figure 6A:
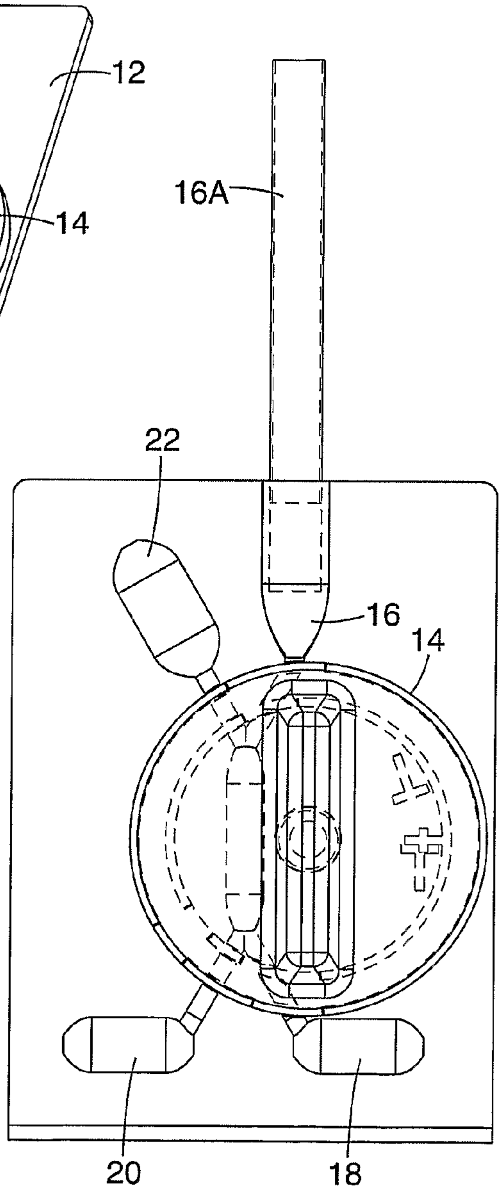
FIGS. 6A, 6B and 6C are orthogonal views of the inventive apparatus of FIG. 5.
Figure 6B:
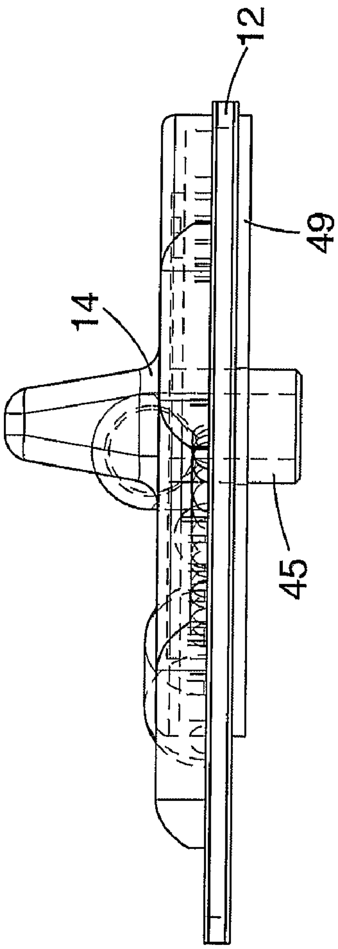
Figure 6C:
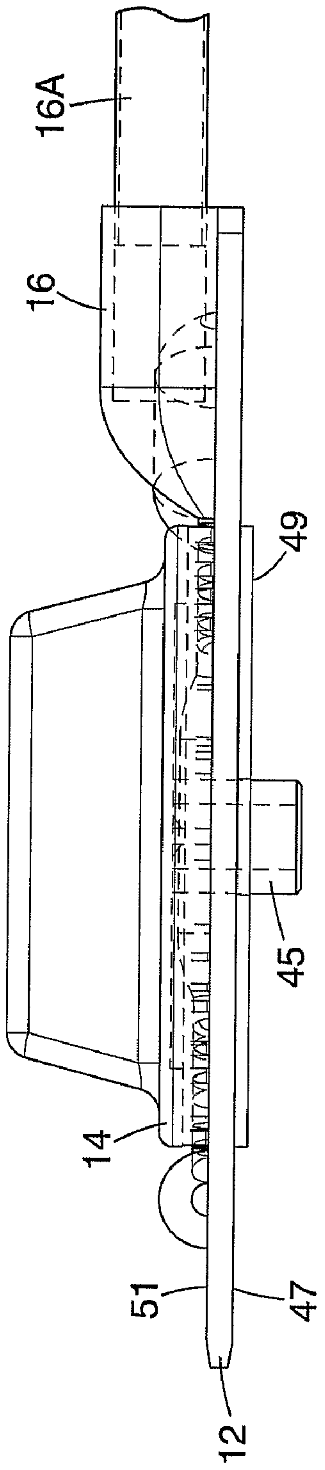

In FIG. 3, frame 12 has a valve mounting feature 38 (such as an opening or mounting knob) for mounting valve 14 to frame 12. Valve 14 includes a feature that corresponds to the shape and size of feature 38 and valve 14 and knob 38 mate in order to attach valve 14 to frame 12. As seen in FIGS. 6B and 6C, valve 14 includes or is attached to rotate around a shaft 45 which extends from a back side 47 of frame 12. A stiffening washer 49 is also provided on back side 47 of frame 12. Washer 49 is sized to extend opposite the sealing portions of valve 14 (e.g., actuating ribs 4) to further stiffen the frame 12 adjacent flow restrictor locations 117, 119, 121 and 123 and aid in forming uniform seal forces. Washer 49 may be formed from a suitable stiffener such as cardboard, plastic (e.g., polyearbonate) or metal. A fastener (not shown) such as a Tinnerman style nut may be used to attach the valve 14 and shaft 45 relative to the frame 12. Bias of valve 14 toward a top side 51 of frame 12 may be achieved by placement of a wave washer (not shown) between the Tinnerman style nut (not shown) and the washer 49. Any suitable arrangement for rotatably mounting valve 14 to frame 12, while biasing valve 14 towards top side 51 of frame 12, will suffice.

Stops 40 and 42 as shown in FIG. 3 are also attached to frame 12 and project therefrom. Stops 40 and 42 help to prevent valve 14 from turning past a predetermined point. Specifically, if valve is rotated in a certain direction, stops 40 and/or 42 engage with a portion of valve 14 and prevent valve 14 from rotating further in that direction. If valve 14 had a 360-degree range of motion, an operator may unintentionally and accidentally open and close different flow paths through central housing segment 15.

As previously mentioned, in alternate embodiments, the sample preparation position of valve 14 may comprise two or more positions. In one embodiment, valve 14 includes first and second sample preparation positions. In the first sample preparation orientation, valve 14 closes off pathways 19, 21, and 23 between central housing segment 15 and second, third, and fourth housing segments 18, 20, and 22, respectively. This opens up flow path 17 between first housing segment 16 and central housing segment 15. The first sample preparation position allows the eluted sample to sit within central housing segment rather than flowing directly through central housing segment 15. An apparatus operator then has the option of releasing the eluted sample from central housing segment 15 after a sufficient time to allow capture medium 24 to capture the analyte from the eluted sample and/or for the analyte to react with a reagent. In the second sample preparation position, valve 14 closes off pathways 17, 19, and 23 between central housing segment 15 and first, second, and fourth housing segments 16, 18, and 22, respectively. This opens up flow path 21 between third housing segment 20 and central housing segment 15, and the eluted sample (minus the captured analyte) may be released from central housing segment 15.

In another embodiment, which may be combined with the embodiment having two sample preparation positions, valve 14 includes first and second testing positions. In the first testing position, valve 14 closes off pathways 17, 19, and 21 between central housing segment 15 and first, second, and third housing segments 16, 18, and 20, respectively. As a result, pathway 23 is the only open pathway from central housing segment 15. The first testing position allows the second buffer 25 (retained in fourth housing segment 22) to sit within central housing segment 15. If a reagent material is disposed in fourth housing segment 22, fourth pathway 23, or central housing segment 15, the option of having a first testing position allows an operator to control the amount time in which the analyte and reagent may react. In the second testing position, valve 14 closes off pathways 17, 21, and 23 between first, third, and fourth housing segments 16, 20, and 22, respectively. Pathway 19 is then the only open pathway from central housing segment 15, and any fluid contained within central housing segment 15 may be released to contact testing device 30. The second testing position allows the operator to control when to allow the analyte and reagent to contact testing device 30. Of course, in both the first and second testing positions, valve 14 does not necessarily need to close pathway 17 because if apparatus 10 is positioned so that gravity flows in direction g, fluid will not likely flow up pathway 17.

Other valve 14 positions are also contemplated. Valve 14 positions depend upon many factors, including the number of housing segments and the type of assay being used to detect the analyte.

The present invention may also be a molded or otherwise fabricated device that includes rigid housing segments and other fluid control components. The flow paths between the central housing and housing segments may be formed of existing tubing components, which incorporate alternate valve arrangements to control fluid flow. The operation of the molded device is similar to apparatus 10 described in reference to FIGS. 1 and 2.

Although the present invention has been described with reference to preferred embodiments, workers skilled in the art will recognize that changes may be made in form and detail without departing from the spirit and scope of the invention.

The complete disclosures of the patents, patent documents and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

The invention claimed is:

1. An apparatus for processing a sample of biological material, wherein the apparatus comprises:

A frame comprising the following integrated components:

- a central housing segment comprising a capture medium adapted to isolate an analyte from the sample of biological material; wherein the central housing segment comprises a deformable blister,
- a first housing segment configured to receive a sample collection assembly having a first fluid reservoir and the apparatus including a first flow path from the first housing segment to the central housing segment;
- a second housing segment comprising a testing device and the apparatus including a second flow path between the central housing segment and the second housing segment;
- a third housing segment configured to retain at least a portion of the first fluid after it is released from the first fluid reservoir and the apparatus including a third flow path between the central housing segment and third housing segment;
- a fourth housing segment comprising a second fluid reservoir and the apparatus including a fourth flow path between the fourth housing segment and the central housing segment; and a rotatable valve comprising a seal selector that is configured to seal off the blister in various configurations, thereby adjusting a flow path of fluid through the central housing segment and to selectively close off a plurality of specific pathways between the central housing segment and each of the first, second, third, and fourth housing segments.

2. The apparatus of claim 1, wherein the second housing segment includes:

a fluid reservoir;

the testing device; and a channel that connects the fluid reservoir and the testing device.

3. The apparatus of claim 1, wherein the testing device is a colorimetric sensor.

4. The apparatus of claim 3, wherein the colorimetric sensor comprises a polydiacetylene material.

5. The apparatus of claim 2 wherein the channel comprises a plurality of microfluidic channels.

6. The apparatus of claim 1, wherein the valve assembly comprises a rotary valve.

7. The apparatus of claim 1, wherein the capture medium is selected from a group consisting of beads, a porous membrane, a foam, a frit, a screen, and combinations thereof.

8. The apparatus of claim 1 wherein the capture medium is coated with a ligand specific to the analyte.

9. The apparatus of claim 1, wherein the first fluid reservoir is a deformable squeeze bulb.

10. The apparatus of claim 1 wherein the second fluid reservoir comprises an outlet port, and wherein the outlet port comprises a dehydrated reagent coated on at least a part of an interior of the outlet port.

11. The apparatus of claim 1 wherein the valve assembly is configured to regulate flow in a plurality of the flow paths between the first, second, third and fourth housing segments and the central housing segment.

12. The apparatus of claim 1, in combination with the sample collection assembly including a swab.

13. The apparatus of claim 1, wherein the third housing segment comprises an absorbent material.

14. The apparatus of claim 1, wherein the first, second, third, and fourth housing segments each comprise a generally flexible wall attached to a generally rigid frame.

15. The apparatus of claim 1, wherein the central housing segment further comprises a reagent material adapted to react with the analyte.

16. The apparatus of claim 1 wherein the fourth housing segment includes an outlet port disposed between the second fluid reservoir and the central housing segment, wherein the outlet port comprises a dehydrated reagent.

17. The apparatus of claim 1, wherein the central housing segment comprises a deformable blister, and wherein the valve comprises a seal selector that is configured to seal off the blister in various configurations, thereby adjusting a flow path of fluid the central housing segment.

18. The apparatus of claim 1 wherein the valve assembly includes a plurality of positions and in a first position, the valve assembly restricts flow in the flow path between the central housing segment and the second housing segment and in a second position, the valve assembly restricts flow in the flow path between the central housing segment and the third housing segment.

19. A method of processing a sample of biological material, the method comprising:

providing the apparatus of claim 1;

eluting a sample of biological material from a sample collection device into the first housing segment using a first fluid;

directing the first fluid along the first flow path from the first housing segment to the first housing segment to capture analyte in a central cavity;

collecting the first fluid from the central cavity in the third housing segment;

actuating the valve to close the third flow path a flow path and open the second flow path introducing a second fluid from the fourth housing segment into the central housing segment to release the analyte from a capture medium, and provide fluid flow from the central housing segment into the second housing segment for testing.

20. The method of claim 19, and further comprising:

obtaining a sample of biological material with the sample collection device.

21. The method of claim 19 wherein the valve is actuated manually or using an automated device.

22. The method of claim 19 and further comprising the step of:

mixing the second fluid with a reagent prior to introducing the second fluid into the central housing segment.

* * * * *

UNITED STATES PATENT AND TRADEMARK OFFICE

CERTIFICATE OF CORRECTION

PATENT NO. : 8,012,427 B2
APPLICATION NO. : 11/997582
DATED : September 6, 2011
INVENTOR(S) : G. Marco Bommarito et al.

It is certified that error appears in the above-identified patent and that said Letters Patent is hereby corrected as shown below:

Column 4,
Line 2, delete “calorimetric” and insert in place thereof --colorimetric--.

Column 10,
Line 19, delete “calorimetric” and insert in place thereof --colorimetric--.

Column 11,
Lines 16-17, delete “polyearbonate)” and insert in place thereof --polycarbonate)--.

Column 12,
Line 46, delete “A frame” and insert in place thereof --a frame--.

Column 14,
Line 28, delete “a flow path”.

Signed and Sealed this
Tenth Day of April, 2012

David J. Kappos
*Director of the United States Patent and Trademark Office*